United States Patent [19]

Bradley

[11] Patent Number: 4,880,069
[45] Date of Patent: Nov. 14, 1989

[54] ELECTRONIC BATHROOM SCALE

[75] Inventor: Richard S. Bradley, Fairmont, Minn.

[73] Assignee: Weigh-Tronix, Inc., Fairmont, Minn.

[21] Appl. No.: 238,249

[22] Filed: Aug. 30, 1988

[51] Int. Cl.[4] .......................... G01G 3/14; G01G 3/08
[52] U.S. Cl. .................................... 177/211; 177/229; 177/DIG. 9
[58] Field of Search ................. 177/211, 229, DIG. 9; 73/862.65

[56] References Cited

U.S. PATENT DOCUMENTS

| | | | |
|---|---|---|---|
| 4,223,752 | 9/1980 | Belcher | 177/211 |
| 4,492,279 | 11/1985 | Speckhart | 177/211 X |
| 4,666,006 | 5/1987 | Wernimont | 177/211 |

Primary Examiner—George H. Miller, Jr.
Attorney, Agent, or Firm—Merchant, Gould, Smith, Edell, Welter & Schmidt

[57] ABSTRACT

A low profile electronic bathroom scale includes a base having a pair of elongate rigid deformable members affixed thereto. The end portions of the deformable members are spaced from the base and define cantilevered beams having a plurality of strain gauges secured to the respective upper surfaces thereof. A rigid deck is secured to the ends of the deformable members by clips so that the weight of a person on the deck is transferred to the deformable members, causing the latter to deform, and imposing a strain on the strain gauges. The bridge circuit output signal is converted into a perceptive weight read-out.

6 Claims, 1 Drawing Sheet

U.S. Patent   Nov. 14, 1989   4,880,069
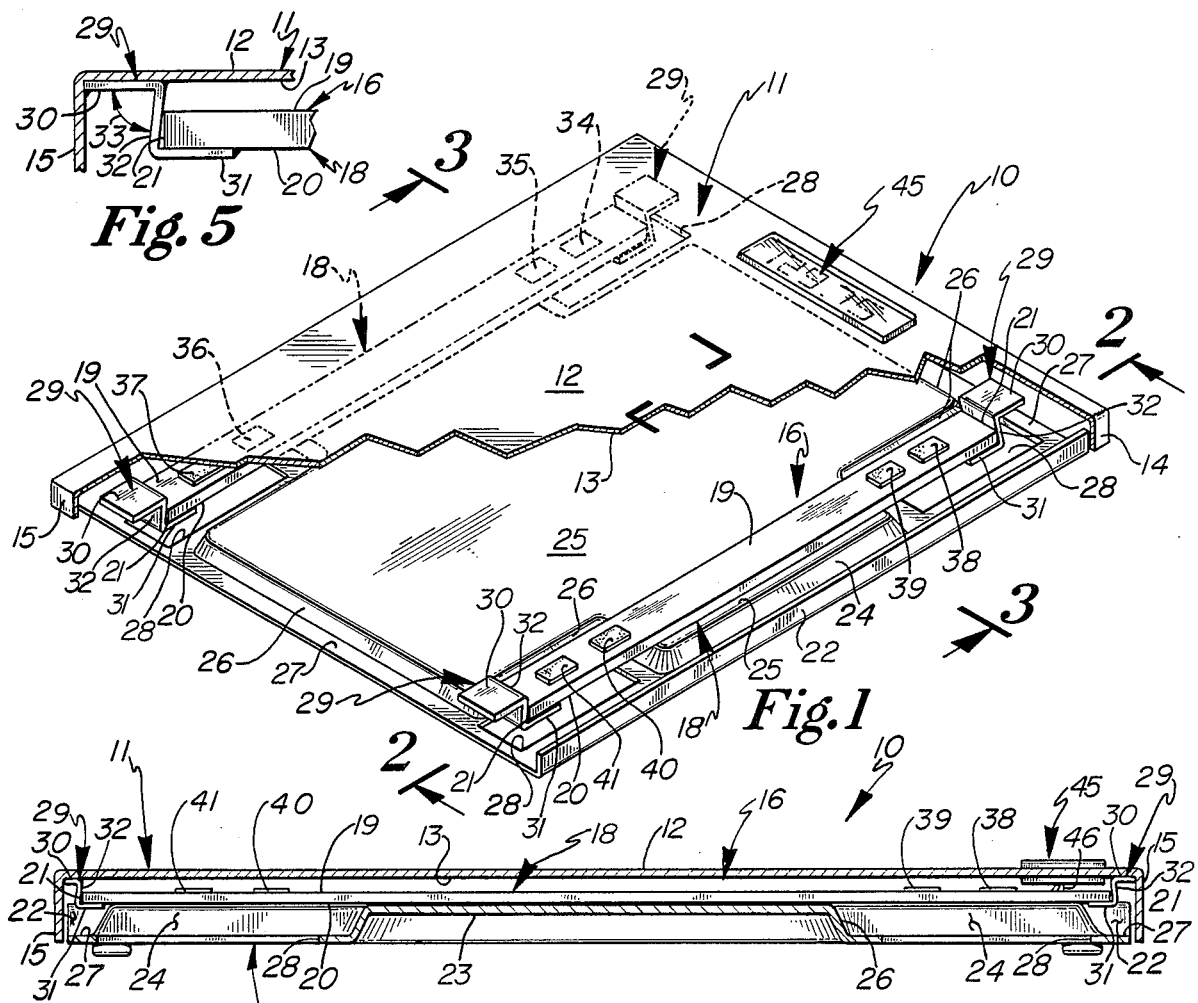
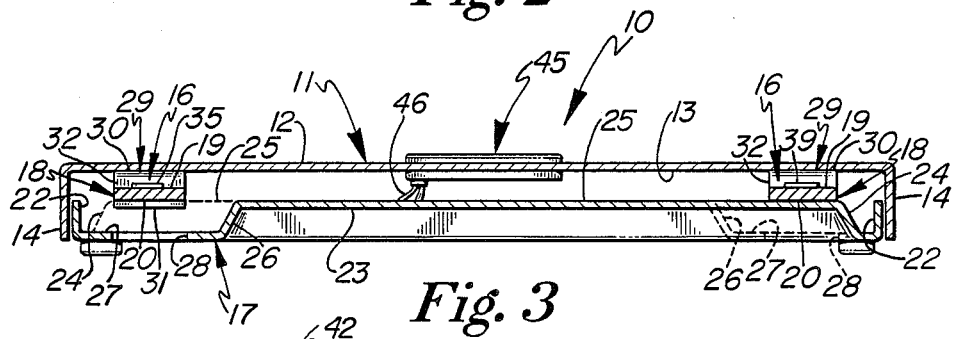
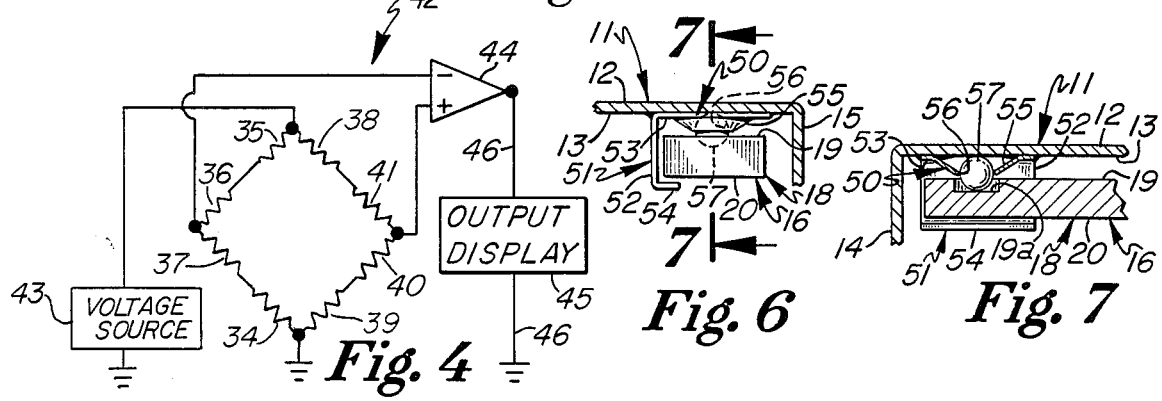

ELECTRONIC BATHROOM SCALE

This invention relates to a bathroom scale and, more particularly, to an electronic bathroom scale.

BACKGROUND OF THE INVENTION

At the present time, there are many bathroom scales in the marketplace which are described as electronic bathroom scales. However, most of these scales are actually hybrid scales; that is, part mechanical and part electronic. In this regard, the base or load receiving component of these prior art hybrid scales is completely mechanical and quite similar to the mechanical bathroom scales which have evolved over many years. In these mechanical bathroom scales, most of them have a base lever assembly, which is connected to the mechanical dial by a link.

When electronic bathroom scales are manufactured using mechanical bathroom scale technology, some manufacturers anchor the end of the mechanical link, which ordinarily attaches to the mechanical dial, and then incorporate a strain gauge assembly to the link. Other manufacturers allow the link to float or move, but incorporate a linear variable differential transformer (LVDT) system. In either case, by applying an excitation voltage to the strain gauge or the LVDT, a signal is produced, which is proportional to weight, and this can be ultimately converted to a digital read-out of weight.

Presently, there are many different electronic output configurations, especially when the electronic means uses a micro-processor. In this regard, there are voice activated weight displays and information storage capabilities that allow the user to recall and compare present weights with weights measured at an earlier time for the purpose of monitoring diets. However, the performance and operation of these electronic bathroom scales is essentially the same as the prior art mechanical bathroom scales because they still use levers and pivots in the base.

It is also well-known that bathroom scales are notoriously inaccurate and must be placed on a hard surface in order to have any accuracy at all. It is also well-known that the accuracy of such scales changes with time, as a result of corrosion and wearing of parts. Further, it has been necessary in mechanical scales and in electromechanical scales to use levers and pivots to scale down a weight to cause the proper dial movement. Friction in the mechanical system of bathroom scales also produces inaccuracies.

SUMMARY OF THE INVENTION

It is a general object of this invention to provide a novel electronic bathroom scale of low profile configuration which uses no moving parts, but provides extreme accuracy in weighing.

Another object of this invention is the provision of an electronic bathroom scale having a weight receiving element rigidly connected to the base by cantilevered beams provided with a strain gauge system, which measures the deflection of the beams for ultimately determining the weight of the user.

A further object of this invention is the provision of novel clips for connecting the load receiving element to base supported cantilevered beams, which are provided with strain gauges to measure the deflection of the beams, the strain gauges being connected together in a Wheatstone bridge circuit for measuring differential bending moment to determine the weight of the user.

These and other objects will be more fully defined in the following Specification.

FIGURES OF THE DRAWING

FIG. 1 is a perspective view of the novel bathroom scale, with certain parts thereof broken away for clarity;

FIG. 2 is a cross-sectional view taken approximately along the line 2—2 of FIG. 1 and looking in the direction of the arrows;

FIG. 3 is a cross-sectional view taken approximately along the line 3—3 of FIG. 1 and looking in the direction of the arrows;

FIG. 4 is a circuit diagram of the electrical circuit used in the novel bathroom scale;

FIG. 5 is an enlarged fragmentary view of a portion of the scale illustrating details of construction thereof;

FIG. 6 is a fragmentary sectional view similar to FIG. 5, but illustrating a different embodiment of the means securing and interconnecting the deck of the scale with the deformable members; and FIG. 7 is a cross-sectional view taken approximately along the line 7—7 of FIG. 6 and looking in the direction of the arrows.

DESCRIPTION OF THE PREFERRED EMBODIMENT

Referring now to the drawings and, more specifically, to FIG. 1, it will be seen that one embodiment of the novel electronic bathroom scale, designated generally by the reference numeral 10, is thereshown. The electronic bathroom scale 10 includes a load receiving member, which comprises a generally flat, rectangular-shaped deck 11. The deck 11 has a substantially flat upper surface 12, a flat lower surface 13, and has downturned longitudinal flanges 14 and downturned end flanges 15. The deck 11 is preferably formed of a suitable rigid material, preferably metal, such as steel or the like.

The load receiving member or deck 11 is rigidly connected to a pair of weight-sensing members 16, which, in turn, are rigidly affixed to a generally rectangular-shaped base 17. The weight sensing members 16 include a pair of substantially identical elongate generally rectangular-shaped deformable members or flat bars 18, each having a flat upper surface 19 and a flat lower surface 20. Each deformable member also has substantially end edges 21.

It will be noted that the longitudinal edge portions of the base 17 are downwardly struck to define downturned longitudinal flanges 22. The base 17 also includes a generally rectangular-shaped central portion 25 having lateral extensions 24. The central portion of the base 17 has a substantially flat upper surface and peripheral sloping walls 26 that are integral with peripheral portions 27. The peripheral portions 27 of the base are disposed substantially parallel to the central portion 25. Rectangular-shaped openings 28 are located adjacent the corners of the base and in the peripheral portions thereof. It will be noted that the rectangular openings 28 are spaced longitudinally from the associated lateral extensions of the central portion and are spaced longitudinally from the end edges 21 of the base.

In the embodiment shown, the central portions of each of the deformable members 18 are rigidly secured to the upper surface of the lateral extensions 24 by spot welding. It will be noted that the end portions of the deformable members 18 extend beyond the lateral extensions of the central portion and that these end portions of each deformable member actually define a cantilevered beam.

Means are provided for securing the end portions of the deformable members 18 to the load receiving member or deck 11, and this means includes generally Z-shaped clips 29. In the embodiment shown, each clip 29 secures one end of each deformable member to the lower surface of the deck 11. The clips 29 are formed of a suitable rigid metallic material, and each includes an upper horizontal element 30, a lower horizontal element 31, and a vertical element 32, which is integral with the upper and lower horizontal elements. In the embodiment shown, the included angle between each horizontal element and the vertical element is 86 degrees. It will be noted that the end portion of each deformable member 38 is positioned upon the lower horizontal element of the associated clip, and the end edge of each deformable member engages the vertical element of the associated clip. Each clip is secured to the lower surface of the deck 11 and to the end portion of the associated deformable member by spot welding, to provide a rigid connection between the deck and each deformable member. Thus, it will be seen that the load receiving member or deck 11 and the base and the load sensing members are rigidly connected together and contain no moving parts. It will further be noted that the end portions of the deformable members which define the cantilevered beams are positioned over the openings 28 in the base 17. It is pointed out that each weight sensing member 16 includes a strain gauge system.

Referring again to FIG. 1, it will be seen that one of the deformable members 18 has electrical strain gauges 34 and 35 secured to the upper surface thereof, adjacent one end portion thereof. The same deformable member also has electrical strain gauges 36 and 37 secured to the upper surface thereof, adjacent the other end portion thereof. It will be noted that the strain gauges at each end are longitudinally spaced apart. It will further be noted that the other deformable member has electrical strain gauges 38 and 39 secured to the upper surface, adjacent one end portion thereof and electrical strain gauges 40 and 41 secured to the upper surface, adjacent the other end portion thereof. The last-mentioned strain gauges are also longitudinally spaced apart in the manner of the strain gauges mounted on the other deformable member.

These electrical strain gauges are of the electrical resistance type and consist of a strain-sensitive conductor placed between a pair of electrical contacts. In configuration, each strain gauge may comprise a thin metallic foil, which has been etched to the desired shape. In operation, each strain gauge is constrained to deform in the same way as that portion of the surface 19 of the associated deformable member 18. In this regard, the strain-sensitive conductor of each strain gauge deforms as if it were a part of the deformable member 18.

Referring now to FIG. 4, it will be seen that the Wheatstone bridge circuit, designated generally by the reference numeral 42, is operable for measuring differential bending moment and for converting the measurement into a perceptible weight read-out. It is pointed out that all of the strain gauges are constructed to have substantially the same electrical resistance when no weight is present on the weight receiving member. It is further pointed out that the strain gauges have substantially identical gauge factors; that is, the resistance of each strain gauge should change by an identical amount when each strain gauge is exposed to the same strain. It is also pointed out that the strain gauges also have identical temperature coefficient of resistance and are not affected by ambient temperature changes.

It will be noted that strain gauges 34 and 37 are in one arm of the Wheatstone bridge and that strain gauges 35 and 36 are in another arm of the bridge circuit. Similarly, strain gauges 38 and 41 are in one arm, while strain gauges 39 and 40 are in the other arm of the bridge circuit.

The Wheatstone bridge circuit is excited by a voltage source 43, which supplies voltage to the circuit. The voltage source may supply direct or alternating current.

When a person steps upon the load receiving member or deck 11, the load is transmitted via the clips 29 to the weight sensing members 16. Specifically, the end portions of the deformable members 18 will deflect downwardly, thereby imposing a strain on the strain gauges. An amplifier 44 inverts and amplifies the bridge output signal. The signals are summed before reading the amplifier, and this signal is supplied by a conductor to the output display 45. The output display may be easily read by a user and presents a mathematic summation of the differential bending moments of the cantilevered beams defined by the end portions of the deformable members 18.

The particular configuration of the clips 29 is essential in permitting the use of bending beam technology in the bathroom scale. In this regard, it will be noted that the cantilevered portions of the weight-sensing members are pulled down by the lower horizontal element of the clips. The measurement and summing of differential bending moments permits the bathroom scale to be constructed of an extremely low profile and obviates the need for any moving parts. Furthermore, since there are no moving parts, the scale will read and perform accurately, whether it is placed on a hard surface or an uneven surface, such as a shag rug or the like. It is also pointed out that the bathroom scale 10 has a 0.1% to 1% accuracy that will not change with use or time.

Referring now to FIGS. 5, 6, and 7, it will be seen that a different embodiment of the means securing the end portions of the deformable members to the load receiving member or deck 11 is thereshown. This means is designated generally by the reference numeral 50 and includes four retaining clips 51, each interrelating one end of each deformable member 18 to the lower surface of a corner portion of the deck 11. Each clip 51 includes a vertical arm 52 having its upper end portion integral with a horizontal arm 53. Portions of the horizontal arm 53 are welded to the lower surface of the deck 11. The lower end portion of the vertical arm 52 is integral with an inturned horizontal retaining lip 54, which is normally spaced below the end portion of one of the deformable members 18 in underlying relation thereto.

The horizontal arm 52 of each clip 51 has a downwardly struck central portion 51 having a central opening 56 therein. The downwardly struck portion 55 accommodates a spherical ball 57, which is seated in the opening 56 therein. The horizontal arm is ring-welded to the deck adjacent the periphery of the downwardly struck portion, as best seen in FIG. 7.

A portion of the ball 57 projects from the opening 56 and is positioned within a recess 19a formed in the upper surface of the associated deformable member 18 adjacent the end portion of the latter. It will be seen that the ball 57 for each clip 51 will have revolvable point contact with the lower surface of the deck 11 and with the recessed end portion of the associated deformable member 18 so that, regardless of where the load is applied to the deck, each ball will apply a symmetrical point contact load to the associated deformable members.

From the foregoing, it will be seen that I have provided a novel low-profile bathroom scale, which is completely electronic, and which functions in a more efficient manner than any heretofore known comparable bathroom scale.

What is claimed is:

1. A low profile electronic bathroom scale comprising a base plate formed of rigid material,
   a generally horizontally disposed load receiving member having upper and lower surfaces and being operable for supporting a person to be weighed,
   load sensing means including a pair of elongate substantially straight, laterally spaced apart deformable members, each being rigidly secured adjacent its mid-portion to said base plate, each end portion of each deformable member being spaced from the base and defining a cantilevered beam,
   a plurality of similar clip members being of generally Z-shaped configuration and each including a horizontal upper element, a horizontal lower element, and an angularly disposed vertical element interconnecting said horizontal elements, one end of each of said deformable members being positioned upon and rigidly secured to the lower horizontal element of a clip member, the upper horizontal element of each clip member being rigidly secured to said load receiving member whereby a load on the load receiving member will be transferred to the cantilevered beams to cause the latter to deform downwardly,
   each end of each deformable member having a plurality of strain gauges secured to the upper surface thereof, and
   a Wheatstone bridge circuit including said strain gauges operable to produce an output signal caused by deformation of said deformable members, said strain bridges being connected in said bridge circuit, and means for converting the output signal into a perceptive weight read-out.

2. The electronic scale as defined in claim 1 wherein said load receiving member comprises a substantially flat plate.

3. The electronic scale as defined in claim 1 wherein each end portion of each deformable member has a pair of electrical strain gauges secured to the upper surface thereof, a strain gauge on one end portion of one deformable member being electrically disposed in the same bridge arm of the Wheatstone bridge circuit as a strain gauge on the other end portion of said one deformable member.

4. A low profile electronic bathroom scale comprising:
   a base formed of rigid material and adapted to be supported on a surface,
   a generally horizontally disposed load receiving member having upper and lower surfaces and being operable for supporting thereon a person to be weighed,
   a pair of elongated horizontally disposed, laterally spaced apart cantilevered deformable beams mounted on said base and each having an upper surface, each beam having an upwardly facing recess in the upper surface at each end portion thereof,
   each beam having a pair of electrical strain gauges mounted on the upper surface thereof adjacent each end thereof, said strain gauges sensing deformation of said cantilevered beams,
   a plurality of ball elements, means securing each ball element to the lower surface of said loading receiving member adjacent one corner thereof, each ball element engaging an end portion of each cantilevered beam in one of said recesses thereof, whereby a load on the load receiving member will cause deformation of said cantilevered beams, and
   circuitry means comprising a single Wheatstone bridge circuit including said strain gauges and being operable to produce an output signal caused by deformation of said cantilevered beams, a pair of said strain gauges being connected in each arm of said Wheatstone bridge circuit, and means for converting the output signal into a perceptive weight read-out.

5. The electronic scale as defined in claim 4 wherein said means securing said ball elements to said load bearing member includes a plurality of clips, each of said clips comprising a vertical arm, a horizontal arm integral with the upper end of said vertical arm and being rigidly secured to the lower surface of said load receiving member, an inturned lip integral with the lower end of said vertical arm and underlying one end portion of a deformable member in obstructing relation therewith, said horizontal arm of each clip having a downwardly-struck central apertured portion, each spherical ball element positioned in said downwardly struck central apertured portion of each clip and having revolvable point contact with the lower surface of said load receiving member and the upper surface of a beam adjacent one end portion thereof.

6. The electronic scale as defined in claim 4 wherein a pair of said strain gauges are disposed in each bridge arm of said Wheatstone bridge circuit.

* * * * *

UNITED STATES PATENT AND TRADEMARK OFFICE
CERTIFICATE OF CORRECTION

PATENT NO. : 4,880,069

DATED : November 14, 1989

INVENTOR(S) : Richard S. Bradley

It is certified that error appears in the above-identified patent and that said Letters Patent is hereby corrected as shown below:

In column 6, line 23, please delete "loading" and substitute therefore --load--.

Signed and Sealed this

Twenty-eighth Day of May, 1991

Attest:

HARRY F. MANBECK, JR.

*Attesting Officer*    Commissioner of Patents and Trademarks